United States Patent
Chmelir et al.

(12) 
(10) Patent No.: US 7,030,199 B1
(45) Date of Patent: Apr. 18, 2006

(54) METHOD FOR PRODUCING WATER-SOLUBLE OR WATER-SWELLABLE POLYMERIZATES WITH A VERY LOW RESIDUAL MONOMER CONTENT, PRODUCTS PRODUCED ACCORDING TO THIS METHOD AND THE USE THEREOF

(75) Inventors: Miroslav Chmelir, Krefeld (DE); Kurt Dahmen, Moenchengladbach (DE)

(73) Assignee: Stockhausen GmbH & Co. KG, Krefeld (DE)

( * ) Notice: Subject to any disclaimer, the term of this patent is extended or adjusted under 35 U.S.C. 154(b) by 0 days.

(21) Appl. No.: 09/554,090

(22) PCT Filed: Nov. 13, 1998

(86) PCT No.: PCT/EP98/07290

§ 371 (c)(1),
(2), (4) Date: Jun. 14, 2000

(87) PCT Pub. No.: WO99/26988

PCT Pub. Date: Jun. 3, 1999

(30) Foreign Application Priority Data

Nov. 25, 1997 (DE) .......................................... 197 52 128

(51) Int. Cl.
*C08F 2/00* (2006.01)

(52) U.S. Cl. ...................... 526/73; 526/240; 526/303.1; 526/317.1; 526/319; 528/490

(58) Field of Classification Search .................... 526/73, 526/240, 303.1, 319, 317.1, 555, 556; 528/490
See application file for complete search history.

(56) References Cited

U.S. PATENT DOCUMENTS

| 4,286,082 | A | * | 8/1981 | Tsubakimoto et al. | ......... 52/240 |
|---|---|---|---|---|---|
| 4,340,796 | A | * | 7/1982 | Obayashi et al. | ........... 526/207 |
| 4,766,173 | A | | 8/1988 | Bailey et al. | |
| 4,776,173 | A | * | 10/1988 | Kamarei et al. | ................ 62/63 |
| 4,857,610 | A | * | 8/1989 | Chmelir et al. | ................ 526/88 |
| 4,929,717 | A | * | 5/1990 | Chmelir | ...................... 528/490 |
| 4,954,562 | A | * | 9/1990 | Anderson | .................... 524/430 |
| 4,985,518 | A | * | 1/1991 | Alexander et al. | .......... 526/240 |
| 5,264,471 | A | * | 11/1993 | Chmelir | ....................... 524/35 |
| 5,340,853 | A | * | 8/1994 | Chmelir et al. | ................ 524/56 |
| 5,733,576 | A | * | 3/1998 | Chmelir | ....................... 424/488 |
| 5,856,370 | A | * | 1/1999 | Chmelir | ....................... 521/128 |
| 6,552,141 | B1 | * | 4/2003 | Chmelir et al. | ............. 526/217 |

FOREIGN PATENT DOCUMENTS

| DE | 195 29348 A1 | 2/1997 |
|---|---|---|
| EP | 0303518 A2 * | 7/1989 |
| EP | 0505163 A1 * | 9/1992 |

* cited by examiner

*Primary Examiner*—Tatyana Zalukaeva
(74) *Attorney, Agent, or Firm*—Oblon, Spivak, McClelland, Maier & Neustadt, P.C.

(57) ABSTRACT

The invention relates to a process for producing water-soluble or water-swellable polymer products from acrylic acid and/or acrylic acid derivatives partially or completely neutralized with nitrogen compounds and with exceedingly low levels of residual monomers, which process is characterized by subsequent heating of the polymer product at temperatures of from 120 to 240° C. The polymers produced accordingly are suitable for use as flocculants, dispersants and absorbers.

18 Claims, No Drawings

METHOD FOR PRODUCING WATER-SOLUBLE OR WATER-SWELLABLE POLYMERIZATES WITH A VERY LOW RESIDUAL MONOMER CONTENT, PRODUCTS PRODUCED ACCORDING TO THIS METHOD AND THE USE THEREOF

REFERENCE TO PRIOR APPLICATIONS

This application is a national stage application, under 35 U.S.C. 371, of PCT Application PCT/EP98/07290, filed Nov. 13, 1998, which claims priority to German Application No. 197 52 128.2, filed Nov. 25, 1997.

The invention relates to a process for producing synthetic polymers based on acrylic acid and derivatives thereof, which polymers have an exceedingly low content of residual monomers. The polymers have high molecular weights and either are water-soluble or have high absorptive capacity for water, aqueous solutions and body fluids.

Various synthetic polymer products having absorptive capacity for water and body fluids have been described in numerous patents: e.g. crosslinked polymers and copolymers based on acrylic or methacrylic acid (U.S. Pat. No. 4,018,951, U.S. Pat. No. 4,066,583, U.S. Pat. No. 4,062,817, U.S. Pat. No. 4,066,583, DE-OS 26 13 135, DE 27 12 043, DE 28 13 634), or acrylamidopropanesulfonic acid copolymers (DE 31 24 008). These absorbents are virtually insoluble in water, absorbing a multiple of their weight of water, urine or other aqueous solutions at equilibrium. In addition to high absorptive capacity, other properties of synthetic absorbents such as low residual monomer content, low ratio of water solubles and high gel strength of the swollen polymer particles are also mentioned in some patent specifications.

In the production of high molecular weight water-soluble or water-swellable, i.e., partially crosslinked polymers and mixed polymers, complete conversion of the monomers—in particular, monomers based on acrylic acid—has been found impossible. on an industrial scale, residual monomer levels of from 0.1 to 0.5 wt.-% normally are observed in the polymer product.

The toxicity of the monomers remaining in the polymer product is well-known and therefore, a process for producing polymers and mixed polymers virtually free of monomers would be highly convenient. Up to now, since it has not been possible as yet to conduct a polymerization process in such a way that virtually no residual monomers would remain, it has been attempted to remove the toxic residual monomers from the polymer product by converting them into harmless derivatives. Thus, DE-AS 1,070,377 and U.S. Pat. No. 2,960,486 use mixing the aqueous solutions of high molecular weight acrylamide polymers with sodium disulfite solution and drying at 80–120°. One precondition for these methods is processing the polymer product in a highly diluted (2–3%) polymer solution, which is uneconomic, and for this reason these methods have rarely been applied in practice.

The treatment of a polymer gel with an aqueous solution of sodium bisulfite or metabisulfite has been described in U.S. Pat. No. 3,755,280, and with a solid alkali sulfite in EP 175,554, where residual monomer contents of from 0.03 to 0.3 wt.-% have been obtained. Likewise, the JP-PS 56/103207 uses bisulfites, sulfites and pyrosulfites for the same purpose. U.S. Pat. No. 3,780,006 uses gaseous sulfur dioxide in order to decrease the acrylamide concentration in an emulsion polymer. EP 505,163 uses treatment of polymer products with a combination of metabisulfite and a surface-active agent (HLB from 3 to 40) subsequent to completed polymerization, thereby decreasing the residual monomer content down to 10 ppm. From 2 to 5 wt.-% of metabisulfite (relative to the polymer gel having 40% w.s., that is, from 5 to 12.5 wt.-% of metabisulfite relative to the dry polymer product) is necessary in such a secondary treatment of polymer gels in order to achieve the desired decrease in residual monomers. Such high quantities of added substances may have highly negative effects on the application-technical properties.

EP 303,518 A2 describes a process for producing absorbent polymer products based on acrylic acid/acrylamide, and according to this invention, a high degree of neutralization of from 70 to 100 mole-%, a high monomer concentration of at least 50%, and a combination of thermally decomposing azo and redox initiators are used. Owing to these conditions, the reaction proceeds in such a way that all of the water used in the batch undergoes vaporization even during the polymerization, so that subsequent drying can be omitted, and the residual monomer contents are said to drop below 500 ppm, preferably below 200 ppm. The residual monomer levels of the experimental examples have not been specified.

DE 37 24 709 Al describes a process for producing polymer products having low residual monomer content, wherein the polymer products following production are reacted in a swollen form as a gel or in solution with compounds reacting with the double bonds in the residual monomers at 50–150° C.

In U.S. Pat. No. 4,766,173, the decrease of acrylic acid residual monomer in polymer products is effected by subsequent treatment of the polymer products using amino acids of the lysine and cysteine types at temperatures from 80° C. on.

WO 94/20547 describes additives such as bromate and chlorate in the polymerization solution and subsequent heating of the final polymer wherein, inter alia, a decrease of the residual monomers is effected by the additives. The bromates and chlorates may also be added subsequent to the polymerization. Despite these measures, the residual monomer content of the polymer products is between about 135 and 1100 ppm.

While the prior art processes described above permit a substantial decrease of residual monomers, they involve several drawbacks such as malodors as a result of liberated sulfur dioxide, corrosion of the plant by sulfur oxide resultant products (e.g. sulfurous acid and sulfuric acid as well as salts thereof in acidic medium). Above all, however, any subsequent treatment of the final polymer that has been produced represents an additional technological step necessitating additional apparatus and a quite considerable input of time, and also, a quite significant amount of additive remains in the final product and may adversely affect the application-technical properties.

It is therefore the object of the invention to produce synthetic polymer products of per se known chemical composition with high molecular weight or high retention capability for water, aqueous liquids and body fluids, using particular specific conditions so as to obtain final products having an extremely low residual monomer content and good application-technical properties, without necessitating a subsequent treatment of the produced polymers using additional chemical compounds.

Surprisingly, it has now been found that synthetic polymer products based on acrylic acid and having the desired properties and an extremely low content of residual monomers can be produced by free-radical polymerization in aqueous solution, provided at least one basic nitrogen compound such as ammonia is used in the partial or complete neutralization of acid monomer components during the preparation of the monomer mixture to be polymerized, and the polymer products are subjected to subsequent heating at 120 to 240° C., preferably 140 to 180° C. The polymer products according to the process of the invention have an extremely low content of residual monomers, preferably being below 50 ppm, particularly below 30 ppm. Of special importance is the fact that acrylamide, which is rated critical in toxicological terms, can be decreased to a residual content of below 10 ppm.

For example, ammonia or ammonium hydroxide, aliphatic mono- and polyamines, particularly aliphatic $C_1$–$C_{10}$ amines, cycloaliphatic mono- and polyamines, particularly cycloaliphatic $C_6$–$C_{12}$ amines, aromatic mono- and polyamines, particularly aromatic $C_6$–$C_{12}$ amines, heterocyclic amines, hydroxylamine and alkanolamines such as monoethanolamine and diethanolamine or mixtures thereof are used as basic nitrogen compounds for neutralization. Particularly preferred nitrogen compounds are ammonia or ammonium hydroxide, ethanolamine and diethanolamine.

The nitrogen compounds for complete or partial neutralization of the acid monomer components can be employed in the form of their free bases. In this context, part of the acid monomers may also be neutralized by other bases, and the nitrogen compound may be present in a molar deficit relative to these other bases. Advantageously, the nitrogen compound for neutralizing the acid monomer component can be used for neutralization levels ranging from 10 to 100%.

In order to achieve an economic production of the polymers, the polymerization is carried out using initiators which decompose at relatively low temperatures. Inorganic or organic peroxides or redox systems are used as common initiators. When polymerizing in aqueous phase, inorganic peroxodisulfates such as peroxodisulfates are frequently used alone or in combination with a reducing component.

The polymerization can be initiated using a redox initiator system or by means of photopolymerization. The redox initiator system mostly consists of two components, i.e., an inorganic or organic peroxide-containing compound and a reducing component such as sulfite, hydrosulfite, thiosulfate, sulfinic acid, ascorbic acid and their copper, ferrous or manganese salts. Alkali metal or ammonium peroxides such as potassium peroxodisulfate and hydrogen peroxide can be used as inorganic peroxide compounds, and benzoyl peroxide, butyl hydroperoxide as organic peroxides. In general, the polymerization is initiated using a redox initiator system. Other initiators may be used in addition to such an initiator system. In the case of photopolymerization which can be initiated by UV-containing light, so-called photoinitiators like e.g. benzoin or benzoin derivatives such as benzoin ethers, benzil and derivatives thereof such as benzil ketals, acrylic diazonium salts, azo initiators such as 2,2'-azobisisobutyronitrile, 2,2'-azo-bis(2-amidinopropane) hydrochloride or acetophenone derivatives are used. The amounts of peroxide-containing component and reducing component may range from 0.0005 to 0.5 wt.-%, preferably from 0.001 to 0.1 wt.-% (relative to the monomer solution), and the amounts of photoinitiators may range from 0.001 to 0.1 wt.-%, preferably from 0.002 to 0.05 wt.-% (relative to the monomer solution).

Predominantly, possible monomers are acrylic acid, acrylamide, methacrylic acid, and methacrylamide, which arc polymerized to form homopolymers or mixed polymers, but also other monomers such as acrylonitrile, methacrylonitrile, N,N-dimethylacrylamide, vinylpyrrolidone, vinylpyridine, vinyl acetate, as well as other water-soluble polymerizable acids and salts thereof, particularly maleic, fumaric, itaconic, vinylsulfonic, or acrylamidomethylpropanesulfonic acid; also, hydroxy group-containing esters of polymerizable acids, particularly the hydroxyethyl and hydroxypropyl esters of acrylic and methacrylic acid can be used; furthermore, amino group-containing and ammonium group-containing esters and amides of polymerizable acids, such as dialkylamino esters, particularly the dimethyl and diethylaminoalkyl esters of acrylic and methacrylic acid, as well as trimethyl and trimethylammoniumalkyl esters and the corresponding amides. The above monomers can be polymerized alone to form homopolymers or mixed with each other to form mixed polymers. In addition, small amounts of water-insoluble monomers can be copolymerized with the above monomers, e.g. esters of acrylic and/or methacrylic acid with $C_1$–$C_{10}$ alcohols, styrene and alkylated styrenes. In general, the proportion of water-soluble monomers is from 60 to 100 wt.-%, relative to the overall monomers. As a rule, the water-insoluble (hydrophobic) monomers make up for 0 to 40 wt.-% of the monomers.

Small amounts of crosslinking monomers, e.g. monomers having more than one reactive group in their molecule can be polymerized together with the above-mentioned monomers, thereby forming partially crosslinked polymer products which are no longer soluble in water but merely swellable. Bi- or multifunctional monomers, e.g. amides such as methylenebisacrylamide or -methacrylamide or ethylene-bisacrylamide, and also, esters of polyols and alkoxylated polyols, such as diacrylates or triacrylates, e.g. butanediol or ethylene glycol diacrylate, polyglycol di-(meth)acrylates, trimethylolpropane triacrylate, di- and triacrylate esters of trimethylolpropane preferably oxyalkylated (ethoxylated) with 1 to 30 mol alkylene oxide, acrylate and methacrylate esters of glycerol and pentaerythritol, or of glycerol and pentaerythritol preferably oxyethylated with 1 to 30 mol ethylene oxide, and also, allyl compounds such as allyl(meth)acrylate, alkoxylated allyl(meth)acrylate preferably reacted with 1 to 30 mol ethylene oxide, triallyl cyanurate, diallyl maleate, polyallyl esters, tetraallyloxyethane, triallylamine, tetraallylethylenediamine, allyl esters of phosphoric acid or phosphorous acid, and crosslinkable monomers such as N-methylol compounds of amides such as methacrylamide or acrylamide and ethers derived therefrom may be mentioned as crosslinking monomers. The ratio of crosslinking monomers is from 0 to 10 wt.-%, preferably from 0.01 to 3.0 wt.-%, relative to the overall monomers.

The water-absorbing polymeric absorbents are obtained using at least one crosslinker. As crosslinkers, those compounds are used which contain at least 2 or more functional groups (double bonds, epoxy groups) and are capable of being incorporated into the growing polymer chains during polymerization. As a result, crosslinking sites are formed at various positions in the polymer product, which hold together the individual polymer chains, taking such an effect that the polymer particles can merely swell in a liquid and will not dissolve in said liquid. The properties of the crosslinked polymer are determined by the chemical structure of the crosslinker, the number of crosslinking sites, but also, by their distribution in the polymer chains. In case of optimum incorporation of crosslinker into the polymer, crosslinked polymer products will be formed having their crosslinking sites uniformly distributed, so that non-crosslinked regions or even non-crosslinked (i.e., water-soluble) low molecular weight components are barely present in the polymer product. Uniform distribution of the crosslinking sites within the polymer results in a product which also has optimum retention capability for aqueous liquids and optimum gel strength in the swollen state.

The polymerization preferably is performed in aqueous solution, batchwise in a polymerization vessel or continuously on a continuous belt, e.g. according to DE 35 44 770. Given a virtually adiabatic course of polymerization, an aqueous polymer gel is formed at a corresponding initial concentration of from 15 to 50 wt.-% of monomers. By selecting the initial monomer concentration and an appropriate low initial temperature ranging from 0 to 50° C., preferably from 5 to 25° C., it is possible to conduct the polymerization in such a way that the maximum temperature in the aqueous polymer gel being formed can easily be controlled.

According to the process of the invention, the produced polymer is heated at a temperature of 120–240° C., preferably 140–180° C. in order to achieve said low residual monomer content. Care must be taken not to deteriorate other essential properties of the polymer product by an excessively high temperature or long time. The optimum time required for heating depends on the nitrogen compound concentration and temperature level and can be determined using just a few experiments. In most of the cases, a time period between 10 minutes and 2 hours is sufficient, preferably between 10 minutes and 1 hour.

The polymer products are classified in screen fractions required for various applications. For example, when using the crosslinked polymer products as absorbents in the hygiene sector, grain size distributions of from 0.2 to 1 mm are preferred, products ranging from 0.2 to 3 mm are preferably used in the agricultural sector, and products ranging from 0.1 to 1.2 mm for soluble polymers in the flocculant sector.

As a result of the low content of residual monomers, the polymer products according to the invention have the following advantages over well-known polymers produced according to prior art:
1. The polymer products can be used in manufacturing absorbent materials where an extremely low content of residual monomers is demanded for toxicological reasons, e.g. in superabsorbers for the hygiene industry (diapers, incontinence products), food industry (packagings), in soil improvers, etc..
2. The polymer products can also be used in the controlled release of other substances subsequently incorporated in the polymer or contained in the polymer to other bodies, e.g. in dosing drugs in human medicine, in dosing nutrients (fertilizer effect) to plants, insecticides and herbicides in aqueous media, preferably on large water surfaces, with no major quantities of toxicologically critical residual monomers invading the environment.
3. Non-crosslinked, water-soluble polymer products having low residual monomer content may also be used in such applications where low residual monomer levels are demanded for toxicological reasons, e.g. in drinking water treatment, when used as thickening agents in the food industry, in dosing of drugs, etc..

The incorporation of nutrients for plants, of herbicides, insecticides, disinfectants, drugs, antibacterial agents and other substances into the polymer product can be effected by directly adding these compounds to the monomer solution as long as the course of polymerization is not perturbed thereby. However, in case these substances do have an impact on the polymerization, their incorporation has to be effected not before during polymerization or after completed polymerization by including these substances in the ready-produced polymer gel according to e.g. DE 40 29 591, DE 40 29 592 or DE 40 29 593.

EXAMPLES

Absorptive Capacity Determination 1 g of polymer is added with stirring to a 250 ml beaker containing 200 ml of Fertilizer solution*. Following a stirring period of 15 minutes, the magnetic stirrer is turned off, and this is allowed to stand for 45 minutes. The content of the beaker then is poured over a screen having a mesh width of 0.3 mm, where the polymer swollen by the fertilizer solution remains on the screen. The amount of fertilizer solution absorbed by the polymer is calculated in ml/g of polymer from the difference between the 200 ml amount of solution originally employed and the amount of solution having passed the screen.

* Peters® Professional Fertilizer, Grace-Sierra Horticultural Products Comp., Pennsylvania, USA.

Determination of the Residual Monomer Content

The residual monomer components acrylamide and acrylic acid are determined in aqueous extracts of the polymers using HPLC with internal standards.

Example 1

0.9 g of methylenebisacrylamide was initially dissolved in 275 g of water in a polymerization vessel and mixed with 301 g of acrylic acid. Thereafter, the monomer solution was neutralized with 168 g of sodium hydroxide solution (50%) and 118 g of ammonia (25%), cooled to 10° C. and purged with nitrogen. Following addition of the initiator solutions (1.0 g of sodium peroxodisulfate, 0.2 g of 2,2'-azobis(2-methylpropionamidine)dihydrochloride, each in 20 ml of water, and 0.05 g of Irgacure® 651 (photoinitiator, Ciba Geigy Company) in 2 g of acrylic acid), the polymerization was initiated using UV light. Thorough mixing of the initiator solutions with the monomer solution is one precondition for homogeneous polymerization throughout the polymer block. The maximum temperature of 103° C. (in a well-insulated polymerization vessel) was reached within 15 minutes. After completed polymerization, the polymer was heated at 160° C. for 1.5 hours and milled to the desired grain fraction. A crosslinked acrylic acid homopolymer as sodium/ammonium salt had been formed. The screened grain fraction from 200 to 1000 µm was used for further investigations. The absorptive capacity for a 0.1% fertilizer solution was 103 ml/g, and the residual monomer content was 20 ppm of acrylic acid.

Example 2

Under similar conditions as in Example 1, 0.6 g of methylenebisacrylamide was dissolved in 275 g of water and mixed with 301 g of acrylic acid. Thereafter, the monomer solution was neutralized with 261 g of potassium hydroxide solution (50%) and 118 g of ammonia (25%), cooled to 10° C. and purged with nitrogen. Following addition of the initiator solutions as in Example 1, the polymerization was initiated using UV light. The maximum temperature of 102° C. was reached within 10 minutes. After completed polymerization, the polymer was heated at 180° C. for 1.5 hours and milled to the desired grain fraction. A crosslinked acrylic acid homopolymer as potassium/ammonium salt had been formed. The screened grain fraction from 200 to 1000 µm was used for further investigations. The absorptive capacity for a 0.1% fertilizer solution was 110 ml/g, and the residual monomer content was 12 ppm of acrylic acid.

Example 3

0.6 g of methylenebisacrylamide was initially dissolved in 290 g of water in a polymerization vessel and mixed with 208 g of acrylic acid and 223 g of acrylamide solution (40%). Thereafter, the monomer solution was neutralized with 180 g of potassium hydroxide solution (50%) and 39.3 g of ammonia (25%), cooled to 10° C. and purged with nitrogen. Following addition of the initiator solutions as in Example 1, the polymerization was initiated using UV light. The maximum temperature of 104° C. was reached within 8 minutes. After completed polymerization, the polymer was heated at 160° C. for 1.5 hours and milled to the desired grain fraction. A crosslinked acrylic acid/acrylamide copolymer as potassium/ammonium salt had been formed. The screened grain fraction from 200 to 1000 μm was used for further investigations. The absorptive capacity for a 0.1% fertilizer solution was 120 ml/g, and the residual monomer content was 10 ppm of acrylic acid and 10 ppm of acrylamide.

Example 4

Under similar conditions as in Example 3, a terpolymer of acrylamide, acrylic acid and acrylamido(2-methylpropane) sulfonic acid (AMPS) at a ratio of 50/49.3/0.7 mole-% was produced. 50% of the acrylic acid was neutralized with potassium hydroxide solution and 40% with ammonia (25%). After completed polymerization, the polymer was heated for 1.5 hours at 140° C. and 160° C., respectively. The absorptive capacity for a 0.1% fertilizer solution was 110 and 108 ml/g, respectively, and the residual monomer content was 28 ppm of acrylic acid and 9 ppm of acrylamide or 15 ppm of acrylic acid and 7 ppm of acrylamide.

Example 5

0.6 g of methylenebisacrylamide was dissolved in 230 g of water in a polymerization vessel and mixed with 118.6 g of acrylic acid and 446.4 g of acrylamide (40%). Thereafter, the monomer solution was neutralized with 102.6 g of potassium hydroxide solution (50%) and 46.1 g of ammonia (25%), cooled to 10° C. and purged with nitrogen. Following addition of the initiator solutions according to Example 1, the polymerization was initiated using UV light. The maximum temperature of 102° C. was reached within 8 minutes. After completed polymerization, the polymer was heated at 160° C. for 1.5 hours and milled to the desired grain fraction. A crosslinked acrylic acid/acrylamide copolymer as potassium/ammonium salt had been formed. The absorptive capacity for a 0.1% fertilizer solution was 106 ml/g, and the residual monomer content was 15 ppm of acrylic acid and 10 ppm of acrylamide.

Examples 6 to 35

146.5 g of acrylic acid, 372 g of acrylamide solution (40%) and 6.9 g of AMPS were initially mixed in 230 g of water in a polymerization vessel. The monomer solution was added with varying amounts of various crosslinkers, so that polymers having varying crosslinking levels were formed. Methylenebisacrylamide (MBA), triallylamine (TAA) and trimethylolpropane (TMPTA) alone or in combination were used as crosslinkers. Thereafter, the monomer solution was neutralized either with 128.5 g of potassium hydroxide solution (45%) and 56 g of ammonia (25%) (Examples 6 to 14) or with 126 g of ammonia and with 84.2 g of ammonia (25%), respectively (Examples 15 to 35), so as to result in an overall neutralization level of 90% and 60%, respectively. The monomer solution was cooled to 10° C. and purged with nitrogen. Following addition of the initiator solutions according to example 1, the polymerization was initiated using UV light. The maximum temperature of 102–104° C. was reached within 8–12 minutes. After completed polymerization, the polymer was heated at 140° C. for 1.5 hours and milled to the desired grain fraction. Crosslinked acrylic acid/acrylamide/AMPS terpolymers as potassium/ammonium or ammonium salts had been formed.

Grain fractions of from 200 to 1000 μm were used for further investigations. Amounts of crosslinker, absorptive capacities and residual monomer levels can be inferred from the following Table.

| Ex. | Amount crosslinker | | | Neutralization | | Absorptive capacity | Residual monomer | |
|---|---|---|---|---|---|---|---|---|
| | MBA | TMPTA | TAA | KOH | NH$_3$ | 0.1% Fertilizer soln. | AcA | AcS |
| | (% rel. w.s.) | | | (%) | | (ml/g) | (ppm) | |
| 6 | 0.1 | | | 50 | 40 | 142 | 4 | 15 |
| 7 | 0.25 | | | 50 | 40 | 120 | 5 | 11 |
| 8 | 0.3 | | | 50 | 40 | 112 | 5 | 20 |
| 9 | 0.3 | | | 50 | 40 | 113 | 4 | 25 |
| 10 | 0.5 | | | 50 | 40 | 98 | 6 | 40 |
| 11 | | 0.4 | | 50 | 40 | 157 | 5 | 30 |
| 12 | | 0.8 | | 50 | 40 | 146 | 7 | 25 |
| 13 | 0.1 | 0.2 | | 50 | 40 | 135 | 5 | 30 |
| 14 | 0.1 | | 0.4 | 50 | 40 | 112 | 6 | 25 |
| 15 | 0.2 | | | 0 | 60 | 128 | 8 | 10 |
| 16 | 0.25 | | | 0 | 60 | 120 | 11 | 11 |
| 17 | 0.3 | | | 0 | 60 | 114 | 16 | 11 |
| 18 | 0.4 | | | 0 | 60 | 108 | 13 | 10 |
| 19 | 0.2 | 0.1 | | 0 | 60 | 118 | 20 | 15 |
| 20 | 0.2 | 0.2 | | 0 | 60 | 120 | 37 | 30 |
| 21 | 0.2 | 0.4 | | 0 | 60 | 111 | 19 | 10 |
| 22 | 0.1 | | 0.4 | 0 | 60 | 120 | 6 | 5 |
| 23 | 0.1 | | 0.8 | 0 | 60 | 112 | 5 | 5 |
| 24 | 0.2 | | 0.2 | 0 | 60 | 118 | 16 | 20 |
| 25 | 0.2 | | 0.4 | 0 | 60 | 115 | 20 | 15 |
| 26 | 0.2 | | | 0 | 90 | 130 | 7 | 33 |

-continued

| | Amount crosslinker | | | Neutralization | | Absorptive capacity | Residual monomer | |
|---|---|---|---|---|---|---|---|---|
| | MBA | TMPTA | TAA | KOH | NH$_3$ | 0.1% Fertilizer soln. | AcA | AcS |
| Ex. | (% rel. w.s.) | | | (%) | | (ml/g) | (ppm) | |
| 27 | 0.25 | | | 0 | 90 | 120 | 6 | 15 |
| 28 | 0.3 | | | 0 | 90 | 120 | 8 | 13 |
| 29 | 0.2 | 0.1 | | 0 | 90 | 134 | 7 | 12 |
| 30 | 0.2 | 0.2 | | 0 | 90 | 130 | 8 | 38 |
| 31 | 0.2 | 0.4 | | 0 | 90 | 126 | 9 | 11 |
| 32 | 0.1 | | 0.8 | 0 | 90 | 115 | 9 | 13 |
| 33 | 0.2 | | 0.2 | 0 | 90 | 110 | 7 | 35 |
| 34 | 0.2 | | 0.4 | 0 | 90 | 106 | 9 | 12 |
| 35 | 0.2 | | 0.8 | 0 | 90 | 104 | 11 | 20 |

Example 36

The monomer solution according to Example 6 having 0.9 g of methylenebisacrylamide was neutralized with 128 g of potassium hydroxide solution (45%) to a neutralization level of 50%. Following addition of 25.1 g of ethanolamine, the monomer solution was cooled to 10° C. and purged with nitrogen. Following addition of the initiator solutions according to Example 1, the polymerization was initiated using UV light. The maximum temperature of 104° C. was reached within 8 minutes. After completed polymerization, the polymer was heated at 160° C. for 1.5 hours and milled to the desired grain fraction. The absorptive capacity for a 0.1% fertilizer solution was 48 ml/g, and the residual monomer content was 20 ppm of acrylic acid and 17 ppm of acryl-amide.

Example 37

The monomer solution according to Example 6 having 0.9 g of methylenebisacrylamide was neutralized with 120 g of potassium hydroxide solution (45%) to a neutralization level of 50%. Following addition of 50.2 g of ethanolamine, the monomer solution was cooled to 10° C. and purged with nitrogen. Following addition of the initiator solutions according to Example 1, the polymerization was initiated using UV light. The maximum temperature of 104° C. was reached within 6 minutes. After completed polymerization, the polymer was heated at 160° C. for 1.5 hours and milled to the desired grain fraction. The absorptive capacity for a 0.1% fertilizer solution was 46 ml/g, and the residual monomer content was 20 ppm of acrylic acid and 11 ppm of acrylamide.

Example 38

148 g of acrylic acid, 372 g of acrylamide solution (40%), 0.6 g of methylenebisacrylamide, and 1.2 g of triallylamine were initially dissolved in 260 g of water in a polymerization vessel. Thereafter, the monomer solution was neutralized with 126 g of ammonia (25%) to a neutralization level of 90%. The monomer solution then was cooled to 10° C. and purged with nitrogen. Following addition of the initiator solutions (0.8 g of ABAH, 1.0 g of sodium peroxodisulfate, 0.2 g of hydrogen peroxide, and 0.05 g of ascorbic acid, each in 5 ml of water), the polymerization was initiated. The maximum temperature of 100° C. was reached within 10 minutes. After completed polymerization, the polymer was heated at 140° C. for 1.5 hours and milled to the desired grain fraction. A crosslinked acrylic acid/acrylamide copolymer as ammonium salt had been formed. The absorptive capacity for a 0.1% fertilizer solution was 132 ml/g, and the residual monomer content was 10 ppm of acrylamide and 25 ppm of acrylic acid.

Example 39

Initially, 146 g of acrylic acid, 372 g of acrylamide solution (40%) and 14 g of AMPS (50%) in 300 g of water were mixed in a polymerization vessel. Thereafter, the monomer solution was neutralized with 126 g of ammonia (25%) to a neutralization level of 90%. The monomer solution then was cooled to 10° C. and purged with nitrogen. Following addition of the initiator solutions according to Example 1, the polymerization was initiated using UV light. The maximum temperature of 100° C. was reached within 10 minutes. After completed polymerization, the polymer was heated at 140° C. for 1.5 hours and milled to the desired grain fraction. A high molecular weight, water-soluble acrylic acid/acrylamide copolymer with a residual monomer content of 3 ppm of acrylic acid and 5 ppm of acrylamide had been formed. A 0.1% aqueous solution of this polymer had a Brookfield viscosity of 400 mPa.s.

Example 40

Initially, 146 g of acrylic acid was mixed with 493 g of water in a polymerization vessel. Thereafter, the monomer solution was neutralized with 168 g of ammonia (25%) to a neutralization level of 60%. The monomer solution then was cooled to 10° C. and purged with nitrogen. Following addition of the initiator solutions according to Example 1, the polymerization was initiated using UV light. The maximum temperature of 102° C. was reached within 10 minutes. After completed polymerization, the polymer was heated at 140° C. for 1.5 hours and milled to the desired grain fraction. A high molecular weight, water-soluble acrylic acid polymer with a Brookfield viscosity of 240 mPa.s and a residual monomer content of 11 ppm of acrylic had been formed.

Example 41

Example 40 was repeated; however, the polymer was heated to 160° C. instead of 140° C. The polymer product had a Brookfield viscosity of 350 mPa.s, and the residual monomer content was 18 ppm of acrylic acid.

What is claimed is:
1. A process for producing a water-soluble or water-swellable polymer or copolymer comprising:
   providing an acid monomer alone, or in combination with at least one comonomer;
   partially or completely neutralizing said at least one monomer with at least one basic nitrogen compound;

free-radical polymerizing said at least one monomer alone, or in combination with said at least one comonomer to form said water-soluble or water-swellable polymer or copolymer, wherein said free-radical polymerization is started at a temperature of from 0 to 50° C and is performed in aqueous solution at a maximum temperature of no more than 102-104° C, to provide an aqueous polymer or copolymer solution or an aqueous polymer or copolymer gel; and, subsequent to completion of said free-radical polymerization, heating said water-soluble or water-swellable polymer or copolymer at a temperature of from 120° to 240°;

wherein said heating is caried out for a time period between 10 minutes and 2 hours;

wherein the water-soluble or water-swellable polymer or copolymer has a content of residual monomer of less than 50 ppm.

2. The process according to claim 1, wherein said nitrogen compound is selected from the group consisting of ammonia, ammonium hydroxide, hydroxylamine, alkanolamines, alkylamines and mixtures thereof.

3. The process according to claim 1, wherein said nitrogen compound is selected from the group consisting of ammonia, ammonium hydroxide, monoethanolamine, diethanolamine and mixtures thereof.

4. The process according to claim 1, wherein said at least one acid monomer is neutralized with said nitrogen compound up to a neutralization level of from 10 to 100%.

5. The process according to claim 1, wherein monomers based on acrylic acid, methacrylic acid or derivatives of these carboxylic acids are subjected to polymerization.

6. The process of claim 1, wherein said comonomer is vinyl acetate.

7. The process according to claim 1, wherein at least one crosslinker based on a bi- or polyfunctional monomer is used in addition.

8. The process according to claim 1, wherein the polymer or copolymer is heated at a temperature of from 140 to 180° C.

9. The process according to claim 1, wherein the water-soluble or water-swellable polymer or copolymer has a content of residual monomer of less than 30 ppm.

10. The process according to claim 1, wherein the water-soluble or water-swellable polymer or copolymer has a content of residual content of acrylamide of less than 10 ppm.

11. The process according to claim 1, wherein said nitrogen compound is selected from the group consisting of ammonia, ammonium hydroxide, aliphatic monoamines, aliphatic polyamines, cycloaliphatic monoamines, cycloaliphatic polyamines, aromatic monoamines, aromatic polyamines, heterocyclic amines, hydroxylamine, alkanolamines and mixtures thereof.

12. The process according to claim 1, wherein said at least one monomer is selected from the group consisting of acrylic acid, methacrylic acid, maleic acid, fumaric acid, itaconic acid, vinyl sulfonic acid, acrylamidopropanesulfonic acid, and mixtures thereof.

13. The process according to claim 1, wherein said at least one comonomer is selected from the group consisting of acrylonitrile, methacrylonitrile, N,N-dimethylacryl amide, vinylpyrrolidone, vinylpyridine, vinyl acetate, hydroxyl group-containing esters of polymerizable acids, amino group-containing esters of polymerizable acids, amino group-containing amides of polymerizable acids, ammonium group-containing esters of polymerizable acids, ammonium group-containing amides of polymerizable acids, $C_1$-$C_{10}$ alcohol esters of acrylic acid, $C_1$-$C_{10}$ alcohol esters of methacrylic acid, $C_1$-$C_{10}$ alcohol esters of a mixture of acrylic acid and methacrylic acid, esters of acrylic acid and methacrylic acid with styrene, esters of methacrylic acid with styrene, esters of methacrylic acid with alkylated styrene, esters of a mixture of acrylic acid and methacrylic acid with alkylated styrene.

14. The process according to claim 8, wherein said heating is carried out for a time period between 10 minutes and 1 hour.

15. The process according to claim 1, wherein said heating is carried out for a time period between 10 minutes and 1 hour.

16. The process according to claim 1, wherein said free radical polymerization is started at a temperature of from 5 to 25° C.

17. The process according to claim 1, wherein the polymer or copolymer is heated at a temperature of 160° C or 180 ° C.

18. The process according to claim 1, wherein said heating is carried out for a period between 10 minutes and 90 minutes.

* * * * *

UNITED STATES PATENT AND TRADEMARK OFFICE
CERTIFICATE OF CORRECTION

PATENT NO. : 7,030,199 B1
APPLICATION NO. : 09/554090
DATED : April 18, 2006
INVENTOR(S) : Chmelir et al.

It is certified that error appears in the above-identified patent and that said Letters Patent is hereby corrected as shown below:

<u>Title page,</u>
Items [45] and [*], Notice, should read as follows:
-- [45] **Date of Patent: *Apr. 18, 2006**

[*] Notice: Subject to any disclamier, the term of this patent is extended or adjusted under 35 U.S.C. 154(b) by 0 days.

This patent is subject to a terminal disclaimer. --.

Signed and Sealed this

Twenty-seventh Day of June, 2006

JON W. DUDAS
*Director of the United States Patent and Trademark Office*